US010580004B2

(12) United States Patent
Skvortsov et al.

(10) Patent No.: US 10,580,004 B2
(45) Date of Patent: Mar. 3, 2020

(54) SYSTEM AND METHOD OF IDENTIFYING NEW DEVICES DURING A USER'S INTERACTION WITH BANKING SERVICES

(71) Applicant: AO Kaspersky Lab, Moscow (RU)

(72) Inventors: Vladimir A. Skvortsov, Moscow (RU); Evgeny B. Kolotinsky, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 256 days.

(21) Appl. No.: 15/910,365

(22) Filed: Mar. 2, 2018

(65) Prior Publication Data
US 2019/0102780 A1 Apr. 4, 2019

Related U.S. Application Data

(60) Provisional application No. 62/574,259, filed on Oct. 19, 2017.

(30) Foreign Application Priority Data

Sep. 29, 2017 (RU) .................................. 2017133836

(51) Int. Cl.
G06Q 20/40 (2012.01)
H04L 29/06 (2006.01)
G06F 21/57 (2013.01)
H04W 12/08 (2009.01)
G06F 21/73 (2013.01)
G06Q 20/30 (2012.01)
(Continued)

(52) U.S. Cl.
CPC ..... *G06Q 20/40145* (2013.01); *G06F 21/577* (2013.01); *G06F 21/73* (2013.01); *G06Q 20/30* (2013.01); *G06Q 20/322* (2013.01); *G06Q 40/02* (2013.01); *H04L 63/0876* (2013.01); *H04L 63/102* (2013.01); *H04W 4/02* (2013.01); *H04W 12/08* (2013.01); *H04W 12/00503* (2019.01)

(58) Field of Classification Search
CPC ................................................ G06Q 20/40145
See application file for complete search history.

(56) References Cited

U.S. PATENT DOCUMENTS 8,739,278 B2 * 5/2014 Varghese ................ G06F 21/31
726/22
2007/0234427 A1 * 10/2007 Gardner .................. G06F 21/73
726/23
(Continued)

Primary Examiner — Ankur Jain
(74) Attorney, Agent, or Firm — Arent Fox LLP; Michael Fainberg

(57) ABSTRACT

Disclosed are systems and methods of identifying a new device during a user's interaction with online services, such as banking services. In one aspect, a method is provided comprising collecting fingerprint for a device associated with a user, isolating, from the fingerprint, one or more key characteristics of the device which affect device security, performing clustering of previously known devices used by the user based on the one or more key characteristics, computing a difference between the one or more key characteristics of the device and one or more key characteristics of one or more devices which the user previously used to access an online service, wherein the one or more devices are from among the clustering of previously known devices and determining that the device is a new device used by the user when the difference exceeds a threshold value.

22 Claims, 4 Drawing Sheets

(51) Int. Cl.
*H04W 4/02* (2018.01)
*G06Q 20/32* (2012.01)
*G06Q 40/02* (2012.01)
*H04W 12/00* (2009.01)

(56) References Cited

U.S. PATENT DOCUMENTS

| | | | |
|---|---|---|---|
| 2010/0217709 A1* | 8/2010 | Aabye | G06Q 20/10 |
| | | | 705/44 |
| 2011/0302087 A1* | 12/2011 | Crooks | G06Q 20/40 |
| | | | 705/44 |
| 2015/0237049 A1* | 8/2015 | Grajek | H04L 63/0815 |
| | | | 726/7 |
| 2015/0324802 A1 | 11/2015 | Kolkowitz et al. | |
| 2016/0019546 A1* | 1/2016 | Eisen | G06F 21/44 |
| | | | 705/44 |
| 2016/0155128 A1* | 6/2016 | Desai | G06Q 20/4016 |
| | | | 705/44 |
| 2017/0004304 A1* | 1/2017 | Zaitsev | H04L 63/145 |

\* cited by examiner

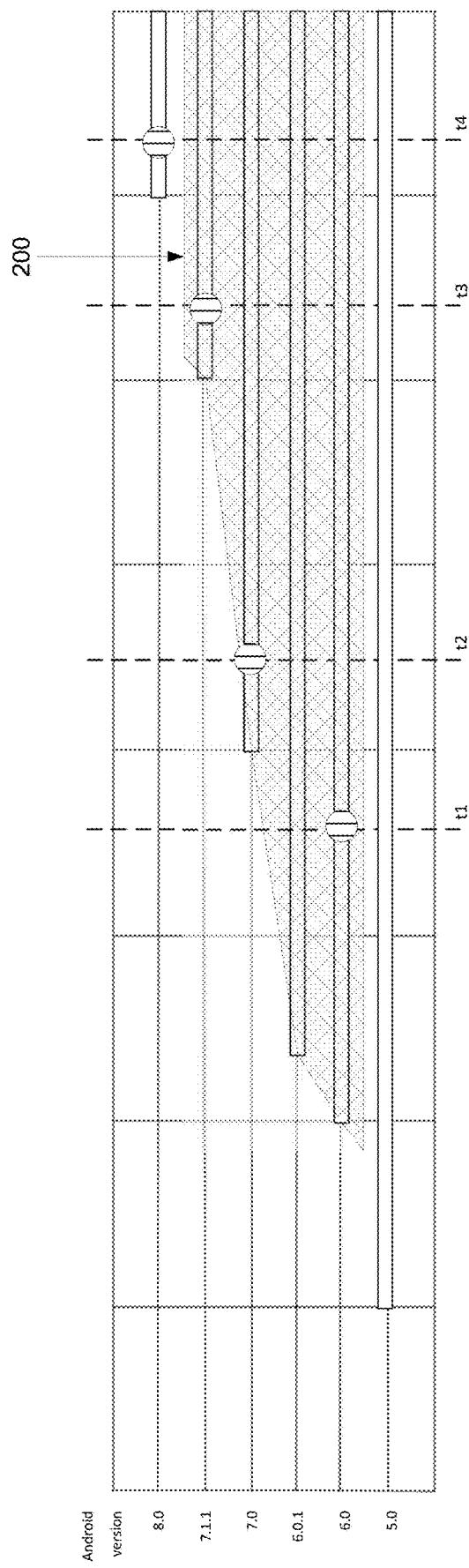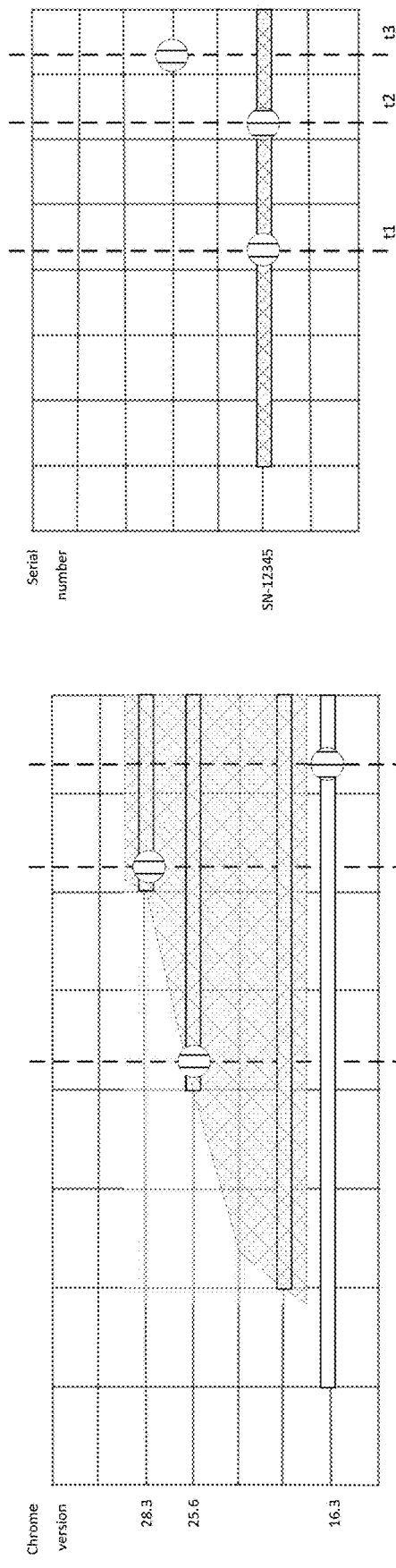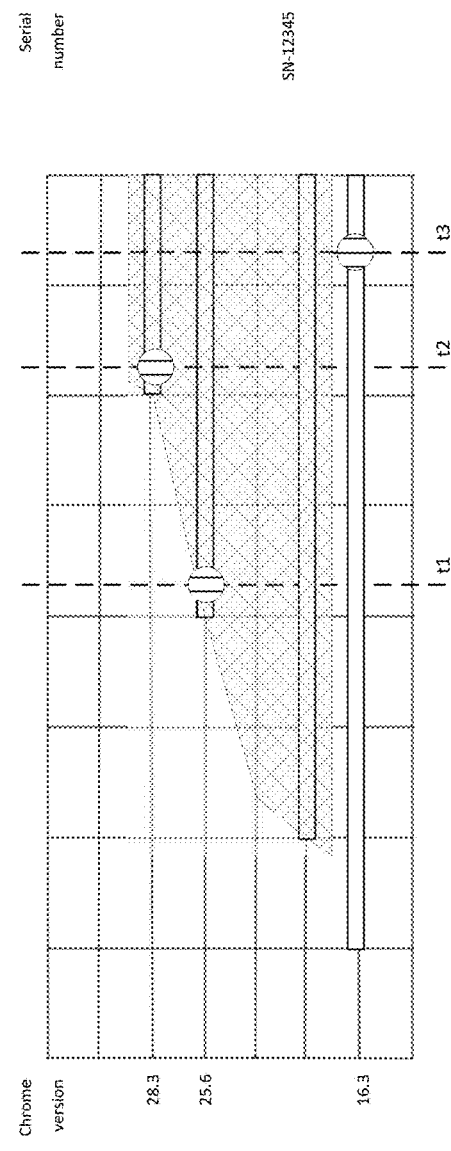

SYSTEM AND METHOD OF IDENTIFYING NEW DEVICES DURING A USER'S INTERACTION WITH BANKING SERVICES

CROSS-REFERENCE TO RELATED APPLICATIONS

This application claims benefit of priority under 35 U.S.C. 119(a)-(d) to a Russian Patent Application No. 2017133836 filed on Sep. 29, 2017, and the benefit of priority under 35 U.S.C. 119(e) to U.S. Provisional Application No. 62/574,259 filed on Oct. 19, 2017, both of which is herein incorporated by reference in their entirety.

FIELD OF TECHNOLOGY

The present disclosure generally relates to solutions for ensuring a secure interaction of a user with banking services, and more specifically, to systems and methods of identifying new devices during a user's interaction with banking services.

BACKGROUND

The sphere of banking services has expanded significantly in recent times. A bank customer (alternatively referred to as a "user") is afforded new ways of interacting with the bank and methods of payment and transfer of funds. A multitude of payment systems, plastic cards, and banking services, such as remote banking services, allow the user to carry out a variety of transactions by using computing devices. Online banking and mobile banking are making it possible to conduct monetary operations without the involvement of a plastic card or bank account details.

Moreover, various mechanisms exist for protecting a user's funds against access by third parties. When a user is working with online banking, a method such as double authentication is frequently used. After entering of the authentication data (such as login and password, which may have become accessible to third parties) in the browser on the bank site, the bank sends the user a message on his or her mobile telephone containing, for example, an additional verification code which has to be entered in a special field.

However, it should be noted that there are many attacks utilizing vulnerable aspects in a user's interaction with banking services that criminals carry out to gain access to the user's funds. Such attacks are often known as fraud activity. For example, with the use of phishing sites it is possible to obtain the login and password of a user for access to the user's online banking account and services. Malicious software for mobile devices allows criminals to gain access to the verification codes from the bank to carry out transactions using the compromised bank account with confirmation, unbeknownst to the user.

Current solutions use a "user device print" to protect users against fraud activity. In general, the user consistently uses the same devices to access bank services, and each device contains a particular set of software and features which are known to the bank. In the event that the set of software changes on the device, or the device itself is changed, there is a high probability that fraud activity is being committed. When fraud activity is committed on a device, the device is considered to be dangerous by the bank.

Thus, some solutions provide describes a system and a method for the authentication of user transactions. The authentication makes use of "prints" of devices, as well as vectors of various combinations of parameters (characteristics of the device, geolocation, information about the transaction itself).

However, sometimes the user may use the very same devices with different set of programs, different firmware and different browsers to access online banking services. The known systems and methods of comparing the prints of devices identify whether a user has used a device before. If so, and if the device is a trusted device, then the procedure of interacting with the bank is simplified. For example, when using the bank application the user does not need to enter a login and password each time and then wait for an SMS; it is enough to merely gain entrance using the PIN code of the application set for the given user. However, in the event of the aforementioned changes in the sets of programs and firmware, the device may be identified by the security systems of the banks as a new device which the user has not previously used to interact with the banking services. In this case, it becomes necessary to identify and authorize the very same device again, which makes its use inconvenient. Such determinations of a device as being new for the user are also known as false alarms of the security systems.

The present disclosure effectively solves the problem of identifying new devices during a user's interaction with banking services.

SUMMARY

Disclosed are systems and methods for identifying new devices during a user's interaction with online services, such as banking services.

In an exemplary aspect, a method is provided for identifying a new device during a user's interaction with online services. In this aspect, the method includes collecting a fingerprint for a device associated with a user, isolating, from the fingerprint, one or more key characteristics of the device which affect device security, performing clustering of previously known devices used by the user based on the one or more key characteristics, computing a difference between the one or more key characteristics of the device and one or more key characteristics of one or more devices which the user previously used to access an online service, wherein the one or more devices are from among the clustering of previously known devices and determining that the device is a new device used by the user when the difference exceeds a threshold value.

In another exemplary aspect, the method includes wherein the one or more key characteristics comprise one or more of the a version of an operating system of the device, firmware of the device, applications and version of the applications installed on the device, device identifier, device serial number, device IMEI, and device hardware features.

In another exemplary aspect, computing a difference includes computing a difference comprises computing a distance between vectors of the one or more key characteristics, computing a rate of change in the distance for the one or more clusters, wherein determining the device is a new device when the rate of change is greater than a threshold value.

In another exemplary aspect, computing the rate of change includes determining one or more risk factors of the device based on the computed difference and transmitting data about the one or more risk factors to a server providing the online services in order to prevent fraudulent activity on the online services.

In another exemplary aspect, a system for identifying a new device during a user's interaction with online services is provided. The system includes an online server providing online services, a collection module, coupled to the online server, executed on a hardware processor, the collection module configured to collect a fingerprint for a device associated with a user accessing the online services, and an analysis module, coupled to the online server and the collection module, executing on the hardware processor, the analysis module configured to 1) isolate, from the fingerprint, one or more key characteristics of the device which affect device security, 2) perform clustering of previously known devices used by the user based on the one or more key characteristics, 3) compute a difference between the one or more key characteristics of the new device and one or more key characteristics of one or more devices which the user previously used to access the online services, wherein the one or more devices are from among the clustering of previously known devices and 4) determine that the device is a new device used by the user to access the online services when the difference exceeds a threshold value.

In another exemplary aspect, a computer readable medium is provided storing therein instructions that when executed perform the methods described in the present disclosure.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 2A-C illustrate examples of the changing of the characteristics of devices over the course of time according to an exemplary aspect of the present disclosure.

DETAILED DESCRIPTION

Exemplary aspects are described herein in the context of a system, method, and computer program product for identifying new devices during a user's interaction with online services, such as banking services. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
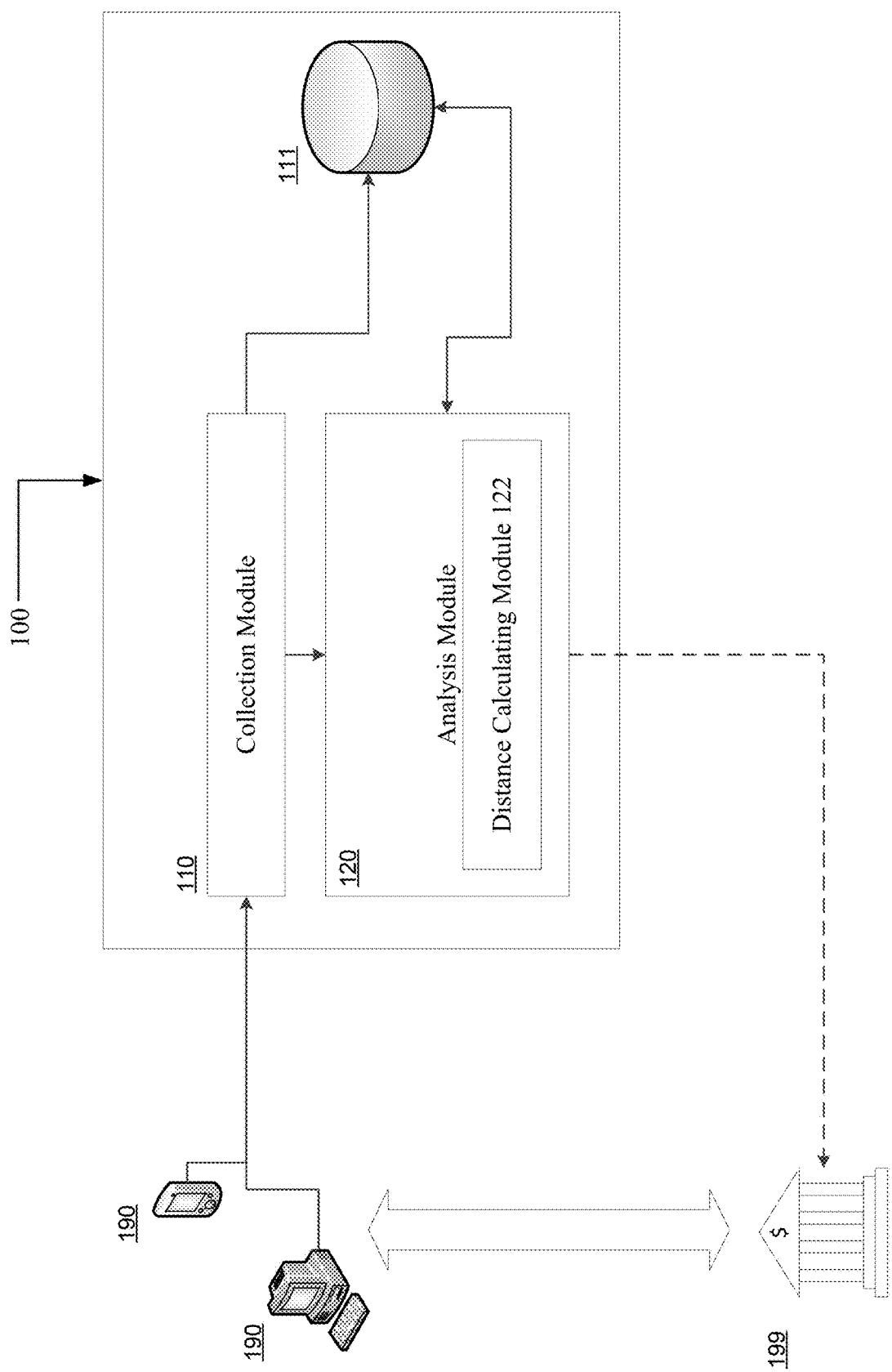
FIG. 1 is a block diagram of a system for identifying new devices of a user according to an exemplary aspect of the present disclosure.

FIG. 1 is a block diagram of a system 100 for identifying new devices of a user according to an exemplary aspect of the present disclosure. The system 100 for identifying a new device 190 provides remote services to the user when the user is interacting with the remote services using an account via the device 190. In one aspect, the system 100 comprises a collection module 110 and an analysis module 120 and is designed to identify new devices 190 during the user's interaction with remote services. In exemplary aspects, remote services may be network or online services that the user interacts with using an account. Examples of such services are online services such as banking services, email, social networks and others (hereinafter referred to, non-limitingly, as banking services 199). In some aspects of the disclosure, the network or online services are executed on and provided by one or more of a remote server, on a distributed system of servers, or alternatively is provided as a cloud service.

According to one aspect of the disclosure, a device 190 is a computing device such as a computer or mobile device, running a software execution environment. In some aspects, the device 190 may be executing a browser or a bank application.

In one aspect, the collection module 110 is designed to collect, or gather, fingerprints (hereinafter the term "prints" is used) of new device 190. In general, the print contains the characteristics of the device 190. The characteristics of the device 190 may comprise, according to one aspect of the disclosure:

the identifier of the operating system (OS) of the device 190;
the location (geolocation) of the device 190;
firmware version and regional characteristics of the firmware installed on the device 190 (such as the continent/country/city);
account identifiers used on the device 190 (for example, the identifier of a MICROSOFT, GOOGLE or APPLE account);
data on whether the device 190 is working within a virtual machine or emulator (whether the device is emulatable);
the presence of root access on the device 190;
the type and version of the browser installed on the device 190;
the plug-ins installed for the browser of the device 190;
the vulnerable applications installed on the device 190 along with known vulnerabilities of the applications;
a device model;
a device identifier;
hardware features of the device (e.g., type of processor, memory size, number of disks, rare devices such as a professional sound card);
a serial number of the device 190;
device IMEI; and
other device characteristics that are discoverable.

In one aspect, the gathering of the mentioned fingerprints is performed by a script (e.g., a JavaScript script) executing in the browser of the device 190. In some aspects, the script may be stored on a bank server and be executed when the device 190 accesses the banking service 199. Thus, in this aspect the collection module 110 is stored on the bank server, and executed on the device 190 of the user.

In yet another aspect, the gathering of the fingerprints from device 190 is performed by security applications (such as antivirus applications). In this case, the collection module 110 is a module of the security application installed on a computer system.

In yet another aspect, the gathering of the fingerprints from the device 190 is performed by an application running on the device 190, wherein the application may be designed to access the banking services (for example, the Citibank online application) 199. In this aspect, the application is created with the use of a software development kit (SDK), provided for example by the manufacturer of the antivirus application (for example, Kaspersky® Mobile Security SDK). In this aspect, the collection module 110 is a module of the mentioned application.

In one aspect, the collection module 110 gathers the fingerprints of the devices 190 at times when the interaction of the user with the banking services is taking place using the device 190. In another aspect, the collection module 110 gathers the mentioned prints of the devices 190 at certain times (for example, according to a schedule, once a day on days off, twice a day on business days). In yet another aspect, the collection module 110 gathers the mentioned prints of the devices 190 at certain intervals of time (for example, every 6 hours).

The data gathered by the collection module 110 about the device 190 is sent to the analysis module 120. In one aspect, the mentioned fingerprints gathered by the collection module 110 about the device 190 are saved by the collection module 110 in a database 111.

The analysis module 120 is executed (functions) on a remote server (or on a distributed system of servers) or as a cloud service. In general, the analysis module 120 computes a vector of key characteristics from the print of the device 190 on the basis of the data obtained from the collection module 110 or from the database 111.

In general, the analysis module 120 singles out the key characteristics, the key characteristics being characteristics which affect the security of the device 190 being used by the user to interact with the banking services 199. In general, the key characteristics are singled out statistically in the process of operation of the system. For example, the characteristic "version of calculator application" cannot be a key characteristic, since it does not affect the security of the device 190 the user is using to interact with the banking services 199. In some aspects, key characteristics are those characteristics that affect security of the device. The key characteristics may comprise the software on the device itself, the version of applications that do not interact often with the internet or the like. According to one aspect, the analysis module 120 does not consider those device characteristics that do not affect device security. In this aspect, the characteristics to be considered are predetermined by an administrator of the system, or dynamically determined based on the device 190. Additionally, key characteristics are those characteristics which change during a "life cycle" of the device, during device use. For example, the serial number of the device or IMEI does not change, however, the official firmware of the phone and the unofficial will show the same IMEI. The system 100 however, will still recognize this device as a different device despite physically being the same device.

In one aspect, the analysis module 120 creates clusters (performs a clustering) of the device 190 and on the basis of at least one key characteristic of the device 190 singled out from the print of the device 190. According to one aspect, clustering is a learning process of the system. In this aspect, the clustering is performed on the basis of several of the mentioned key characteristics of the device 190 which have been singled out, and these in turn are the vector of the key characteristics of the device 190. Thus, the vector of key characteristics contains at least some of the singled-out key characteristics of the device. As a result, for each user the analysis module 120 forms a set of clusters made up of the previously known devices 190. The set of clusters includes not only devices for this particular user, but also for devices with the key characteristics. For each different user, a set of clusters is formed which includes previously known devices.

Next, a distance calculating module 122 computes the distance between the vector of the key characteristics of the device 190 the user is using to interact with the banking services 199 and the vector of the key characteristics of at least one device 190 that the user previously used to interact with an online service, such as the banking services 199. In this aspect, the device which the user previously interacted with forms part of the clusters that were created previously by the analysis module 120. The device 190 is considered to be new if the computed distance exceeds a threshold value. In this aspect, "new" indicates that the user has not interacted with online services such as the banking services 199 with the device before.

On the whole, basic security policies may be used for a new device 190, such as two-factor authentication. The identification of new devices 190 is an important task, but every device 190 cannot be considered to be new, since this is highly inconvenient to the user, as it is necessary to keep applying the same security policies. For example, for devices that the user has previously used to interact with the banking services 199, an additional password request (two-factor authentication) is not provided, nor is a data entry check (for example, CAPTCHA) performed. If the user has entered the online bank for the first time from a different browser or from a new mobile telephone, the device in question is new. However, if the browser version on device 190 has been updated, or the user has updated the telephone firmware to a new version, the devices 190 are not new.

However in some aspects the distance function is not sufficient because that function does not fully reflect the nature of the possible variability of the vector of the key characteristics of the device 190. Thus, for example, the user over the course of some lengthy interval of time may carry out several updates of his or her device 190. In this process, the firmware version will be changed (for example, Android will be updated from version 6 to 7), as will the set of applications in the firmware, the set of applications of the user, and the set of versions of the installed applications. As a result, the distance between the vectors of the key characteristics of the very same device at the beginning and end of the interval of time (during which the firmware of the device 190 and several installed applications were updated) will be greater than the threshold value, which will mean for the present system that the user has got a new device 190, even though the device 190 in fact remains the same. Thus, a false alarm of the system will occur. In order to solve the problem of reducing false alarms, the computing of the distances may take into account the time elapsed between gatherings of the characteristics of the device 190.

Thus, in one aspect, the analysis module 120 calculates the rate of change in the distance between the vectors of the characteristics of the device 190. In general, the rate of change in the distance is computed by the analysis module 120 on the basis of information as to the rate of change in the distance on all known devices 190 of other users corresponding to the clusters which were created. Clusters are generated for all devices (devices of all users), and the device of a particular user is compared with the cluster to which it was assigned. If there are changes between the clusters for all devices and the assigned cluster, the rate of change is calculated according to how much the two clusters correspond to the changes compared to other users. For example, if the device (not necessarily a mobile phone) deviates significantly from the cluster, (e.g., a user with a WINDOWS 10 device with an old version of Internet Explorer), this device is new. The procedure for validating the new device carries out an analysis, and the normal behavior of the device cluster is the increase in the browser version, and not the rollback to the "ancient" version.

In the event that the distance calculated with allowance for the calculated rate of change in the distance is greater than a threshold value, the device 190 is considered to be new for the user. In one aspect, the threshold value is set allowing for the time elapsed since the time of the previous gathering of the print of the device 190.

The rate of change in the distance may be computed, for example, by normalizing the change in the distance of the vectors of the key characteristics of the device 190 over time. For example, the permissible normative values of the key characteristics are computed for the devices 190 of all the users corresponding to the cluster to which corresponds the device 190. In one aspect, the permissible normative values are calculated as an arithmetic mean. In another aspect, the permissible normative values are calculated statistically on the basis of a normal distribution (Gaussian distribution).

An example of the rate of change over time is presented in FIGS. 2A-2C. FIG. 2A illustrates a graph of the change in the firmware version over time. In one example, a device initially had Android 6 installed as the Operating System. At time t1, the user interacted with the banking services 199. Subsequently, the user interacted with banking services 199 at times t2 and t3, but the device had updated the operating system to, respectively, versions Android 7.0 and 7.1.1. Thus, at time t4 if the device 190 was already updated to version Android 8 it is probable that the user updated the telephone with a third-party firmware (such as Cyanogen-Mod®). Thus the device may be considered a new device 190 because the firmware and its faults and vulnerabilities are unknown. Technically, the device may be considered new because the value of the given key characteristic does not correspond to the previously created clusters as the firmware was not officially released by the manufacturer. The designated segment which is shaded shows the permissible deviations of the rate of change in the distance. For example, if the user has a Samsung Galaxy S6 phone, then there is no official firmware from Android 5 and Android 8. If such firmware is detected on the device (and the device has the same IMEI and SN), then the user probably installed custom firmware. Therefore, the security of such a device has changed and the user needs to validate this device. The system 100 considers the device new.

FIG. 2B shows the change in the browser version over time. At time t1 the user accessed the online bank using browser version 25.6. Subsequently, at time t2 the user used version 28.3, but there are other clusters of devices 190 with a similar key characteristic. However, if at time t3 the browser version became 16.3, then there is a probability that the device 190 was compromised or changed. Thus the analysis module pragmatically decides to consider the device 190 as a new device. FIG. 2C shows the change in the serial number of the device 190 over time. The serial number should generally remain unchanged.

In exemplary aspects of the disclosure, the calculated rate of change in the distance between the vectors of the key characteristics of all known devices 190 of other users may be saved by the analysis module 120 in the database 111.

In one aspect of the disclosure, the sequence of vectors of the key characteristics of the devices 190 may be provided by the analysis module 120 in the form of a chain of events, where the nodes of the chain will be the vectors of the key characteristics of the device 190, and the chain links themselves will depend directly on the time.

In one aspect, the analysis module 120 singles out the probabilities (for example, in statistical terms) that the vectors of the key characteristics of the devices 190 will change over time on the basis of the clusters of devices 190 of the users or groups of users. While the probability is slight, if the vector of the key characteristic has changed, the analysis module 120 will determine the change event as being a risk factor.

In general, the probability of change in the key characteristics with allowance for the rate of change in the distance is selected by the analysis module 120 from the database 111. The probability of change in the key characteristics may be added to the database 111 automatically on the basis of statistical data (for example, by the analysis module 120) or by an expert in computer security.

In one aspect, the analysis module 120 analyzes the variability of the rates along the entire chain and on its individual segments. Sharp changes/jumps in the rates will be determined to be risk factors by the analysis module 120.

In yet another aspect, the analysis module 120 determines the dynamics of change in the characteristics of the devices 190 over time and the permissible deviations. Thus, for example, as a result of an update certain characteristics of the device 190 should always change in the same direction (for example, the version number usually always increases). But if the changes in key characteristics in this directional chain of events are aimed in a direction opposite what was expected in even one of the nodes, the analysis module 120 will determine this as being a risk factor.

In yet another aspect, the analysis module 120 determines the reliability of the change which has occurred in the characteristic of the device 190. For this purpose, knowledge may be required from outside sources as to the nature of the anticipated changes (for example, data from Kaspersky Security Network, KSN). For example, if it is known that in a certain interval of time no new versions of devices 190 were released, then no corresponding changes should appear in the observed chain of events. Upon detecting such changes, the analysis module 120 will determine there is a risk factor for fraud activity.

In general, the appearance of a risk factor testifies to a higher probability of fraud from the device 190 on which the risk factor appeared. In one aspect, in the event of the appearance of risk factors, data about the risk factors is transmitted by the analysis module 120 to the security systems of the banking services 199 for the purpose of making decisions on prevention of fraud activity (for example, deciding to block a transaction).

Figure 3:
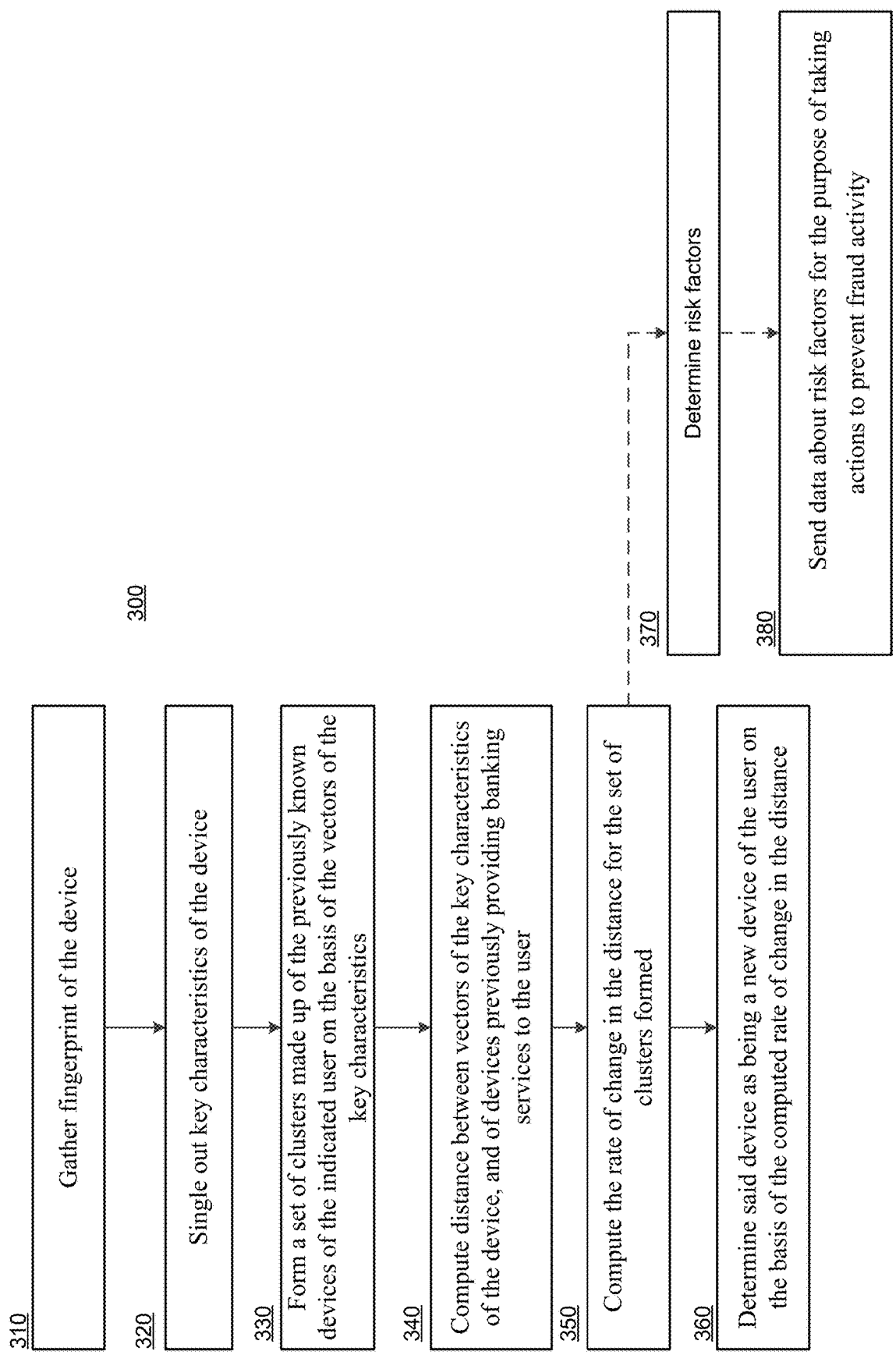
FIG. 3 is a flowchart for a method of identifying new devices of a user according to an exemplary aspect of the present disclosure.

FIG. 3 depicts a diagram of a method 300 of identifying new devices of a user.

Figure 4:
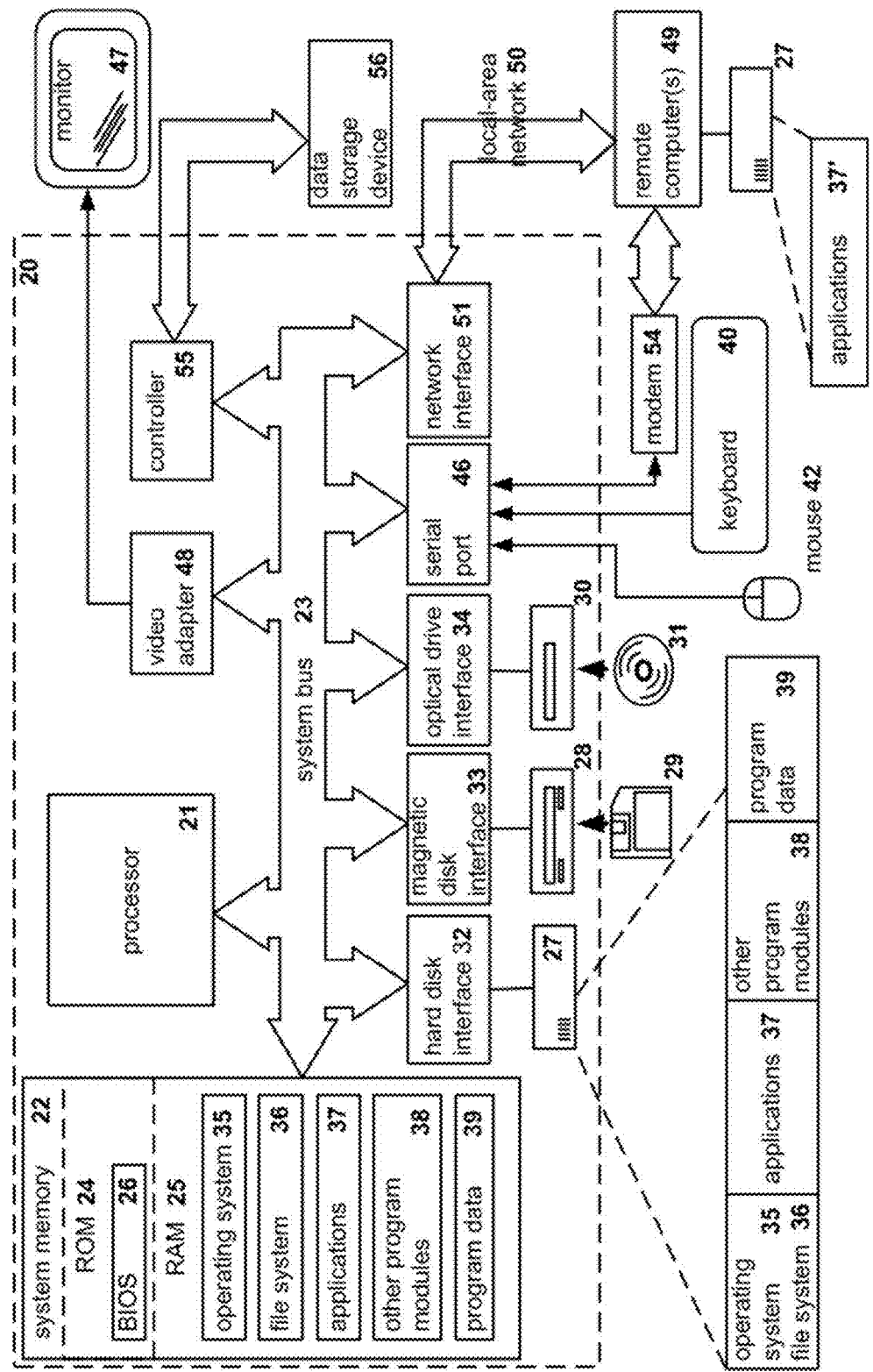
FIG. 4 shows an example of a general-purpose computer system on which the aspects of the system may be realized according to an exemplary aspect of the present disclosure.

The method 300 is an exemplary implementation of portions of the system 100, for example the collection module 110 and the analysis module 120 as executed on a computer system such as the computer system 20 illustrated in FIG. 4.

In step 310 the collection module 110 may collect, or gather, a fingerprint of the user's device. In exemplary aspects, the fingerprint comprises at least one characteristic of said device 190, at the time when the user is interacting with the banking services 199.

In step 320 the analysis module 120 may single out, from the collected characteristics, key characteristics which affect the security of the mentioned device 190.

In step 330 the analysis module 120 may form a set of clusters made up of the previously known devices 190 of said user. The clustering is performed, in one aspect of the disclosure, on the basis of vectors of the key characteristics of the device 190, where the vector comprises at least some of the singled-out key characteristics of the device 190.

In step 340 the analysis module 120 may compute the distance between the vector of the key characteristics of the mentioned device and the vector of the key characteristics of at least one device 190 which previously provided banking services 199 to the user and which forms part of the clusters created in 330.

In step 350 the analysis module 120 may compute the rate of change in the distance computed in 340 for the formed set of clusters. In one aspect, the rate of change is computed on the basis of information as to the rate of change in the distance on all known devices 190 of other users for the set of mentioned clusters.

In step 360 the analysis module 120 may determine that the device 190 is a new device 190 of the user in the event that the computed distance, with allowance for the computed rate of change in the distance, is greater than a threshold value.

In general, any rules for comparing a deviation with a threshold value can be used. While some characteristics were mentioned above, many other characteristics can be considered. For example, the OS version can have 3 values (Android 6, 7, 7.1) while browser versions can have many more values—e.g., Chrome may have 300 versions (62.0.3282-64.1.3132). Determining the number of versions is dependent on implementation details of system 100. If the OS of a device has deviated to Android 5.1, this is an excess. If the version of Chrome has strayed to 61.0.1000—then this is a "relatively" fresh browser, where, in some cases the deviation has not exceed the threshold value. But if the Chrome version became "25.00.0001", then the version is suspicious for the current system and the deviation will exceed the threshold value.

In one aspect, in step 370 the analysis module 120 may additionally determine risk factors for the mentioned device 190 on the basis of the computed rate of change in the distance and the probability of a change in the key characteristics.

In one aspect, in step 380, in event of the appearance of risk factors, the analysis module 120 data about the determined risk factors is transmitted to the security systems of the banking services 199 in order to take actions to prevent fraud activity.

FIG. 4 is a diagram illustrating a general-purpose computer system on which aspects of systems and methods of identifying new devices during a user's interaction with online services may be implemented in accordance with an exemplary aspect of the disclosure.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for identifying a new device during a user's interaction with online services, comprising:
   collecting a fingerprint for a device associated with a user;
   isolating, from the fingerprint, one or more key characteristics of the device which affect device security;
   performing clustering of previously known devices used by the user based on the one or more key characteristics;
   computing a difference between the one or more key characteristics of the device and one or more key characteristics of one or more devices which the user previously used to access an online service, wherein the one or more devices are from among the clustering of previously known devices; and
   determining that the device is a new device used by the user when the difference exceeds a threshold value.

2. The method of claim 1, wherein the one or more key characteristics comprise one or more of the a version of an operating system of the device, firmware of the device, applications and version of the applications installed on the device, device identifier, device serial number, device IMEI, and device hardware features.

3. The method of claim 1, wherein the online service is a banking service.

4. The method of claim 1, wherein computing a difference comprises:
   computing a distance between vectors of the one or more key characteristics;
   computing a rate of change in the distance for the one or more clusters created by the clustering of previously known devices,
   wherein determining the device is a new device when the rate of change is greater than a threshold value.

5. The method of claim 4, wherein the threshold value is set to allow for time to elapse since the fingerprint was previously collected.

6. The method of claim 4, wherein the rate of change is computed based on a rate of change in the distance on a plurality of all devices used by other users corresponding to the clustering.

7. The method of claim 6, wherein the rate of change in the distance is computed by:
   normalizing a change in the distance of the vectors over time.

8. The method of claim 4 wherein computing the rate of change further comprises:
   determining one or more risk factors of the device based on the computed difference; and
   transmitting data about the one or more risk factors to a server providing the online services in order to prevent fraudulent activity on the online services.

9. The method of claim 1 wherein the fingerprint comprises one or more of:
   an identifier of an operating system of the device, firmware of the device, account identifier of the user, emulation data of the device, access information of the device, version information of a browser installed on the device, plugins installed for the browser and vulnerable applications installed on the new device.

10. The method of claim 1 further comprising:
    collecting the fingerprint according to a schedule or after a period of time.

11. A system for identifying a new device during a user's interaction with online services, comprising:
    an online server providing online services;

a collection module, coupled to the online server, executed on a hardware processor, the collection module configured to collect a fingerprint for a device associated with a user accessing the online services; and an analysis module, coupled to the online server and the collection module, executing on the hardware processor, the analysis module configured to:
  isolate, from the fingerprint, one or more key characteristics of the device which affect device security;
  perform clustering of previously known devices used by the user based on the one or more key characteristics;
  compute a difference between the one or more key characteristics of the device and one or more key characteristics of one or more devices which the user previously used to access the online services, wherein the one or more devices are from among the clustering of previously known devices; and
  determine that the device is a new device used by the user to access the online services when the difference exceeds a threshold value.

12. The system of claim 11, wherein the analysis module is configured to compute a difference by:
  computing a distance between vectors of the one or more key characteristics;
  computing a rate of change in the distance for one or more clusters created by the clustering of previously known devices,
  wherein determining the device is a new device when the rate of change is greater than a threshold value.

13. The system of claim 12, wherein the threshold value is set to allow for time to elapse since the fingerprint was previously collected.

14. The system of claim 12, wherein the analysis module is configured to compute a rate of change based on a rate of change in the distance on a plurality of all devices used by other users corresponding to the clustering.

15. The system of claim 14, wherein the rate of change in the distance is computed by:
  normalizing a change in the distance of the vectors over time.

16. The system of claim 11, wherein the one or more key characteristics comprise one or more of the a version of an operating system of the device, firmware of the device, applications and version of the applications installed on the device, device identifier, device serial number, device IMEI, and device hardware features.

17. The system of claim 11 wherein the fingerprint comprises one or more of:
  an identifier of an operating system of the device, firmware of the device, account identifier of the user, emulation data of the device, access information of the device, version information of a browser installed on the device, plugins installed for the browser and vulnerable applications installed on the new device.

18. A non-transitory computer-readable medium storing thereon instructions that when executed by a hardware processor perform a method for identifying a new device during a user's interaction with online services, the method comprising:
  collecting a fingerprint for a device associated with a user;
  isolating, from the fingerprint, one or more key characteristics of the device which affect device security;
  performing clustering of previously known devices used by the user based on the one or more key characteristics;
  computing a difference between the one or more key characteristics of the new device and one or more key characteristics of one or more devices which the user previously used to access an online service, wherein the one or more devices are from among the clustering of previously known devices; and
  determining that the device is a new device used by the user when the difference exceeds a threshold value.

19. The medium of claim 18, wherein computing a difference comprises:
  computing a distance between vectors of the one or more key characteristics;
  computing a rate of change in the distance for one or more clusters created by the clustering of previously known devices,
  wherein determining the device is a new device when the rate of change is greater than a threshold value.

20. The medium of claim 19, wherein the threshold value is set to allow for time to elapse since the fingerprint was previously collected.

21. The medium of claim 19, wherein the rate of change is computed based on a rate of change in the distance on a plurality of all devices used by other users corresponding to the clustering.

22. The medium of claim 21, wherein the rate of change in the distance is computed by:
  normalizing a change in the distance of the vectors over time.

* * * * *